United States Patent [19]
Bauer et al.

[11] Patent Number: 5,382,099
[45] Date of Patent: Jan. 17, 1995

[54] BEARING ASSEMBLY COMPRISING A RADIAL AND AXIAL BEARING

[75] Inventors: Bernhard Bauer, Hassfurt; Rut Heemskerk, Kutzberg; Knut Mirring, Gochsheim; Armin Olschewski, Schweinfurt; Martin Schepp, Schweinfurt; Klaus Kispert, Schweinfurt; Jurgen Scholl, Schweinfurt; Rainer Stanzel, Gerolzhofen; Robert Stolz, Schweinfurt, all of Germany

[73] Assignee: SKF GmbH, Germany

[21] Appl. No.: 42,258

[22] Filed: Apr. 2, 1993

[30] Foreign Application Priority Data

Apr. 4, 1992 [DE] Germany ............... 4211399

[51] Int. Cl.[6] .......... F16C 19/54; F16C 33/66
[52] U.S. Cl. .................. 384/454; 384/465
[58] Field of Search ............... 384/452–455, 384/489, 462, 465, 609, 615

[56] References Cited

U.S. PATENT DOCUMENTS 2,103,912 12/1937 Montgomery ............ 384/613
4,848,936 7/1989 Marie ........................ 384/454

FOREIGN PATENT DOCUMENTS 372305 3/1907 France ..................... 384/452
1897210 4/1964 Germany .

Primary Examiner—Thomas R. Hannon
Attorney, Agent, or Firm—Eugene E. Renz, Jr.

[57] ABSTRACT

A bearing unit consists of a radial bearing 1 and an axial bearing 2, the outer ring 3 of the radial bearing 1 being extended at one end in the axial direction to hold the axial bearing 2.

So that the bearing unit is able to absorb large radial and axial forces and is reliably sealed off against contamination from the outside, the outer ring 3 of the radial bearing 1 consists of a solid piece of material, and the extension $3^a$ of the outer ring 3 is provided, starting from the end surface 4, with a bore $4^a$ to hold the axial bearing 2, this bore being sealed by a bearing housing cover 6, which rests against the end surface $2^a$ of the axial bearing 2 and is connected to the outer ring 3.

8 Claims, 1 Drawing Sheet

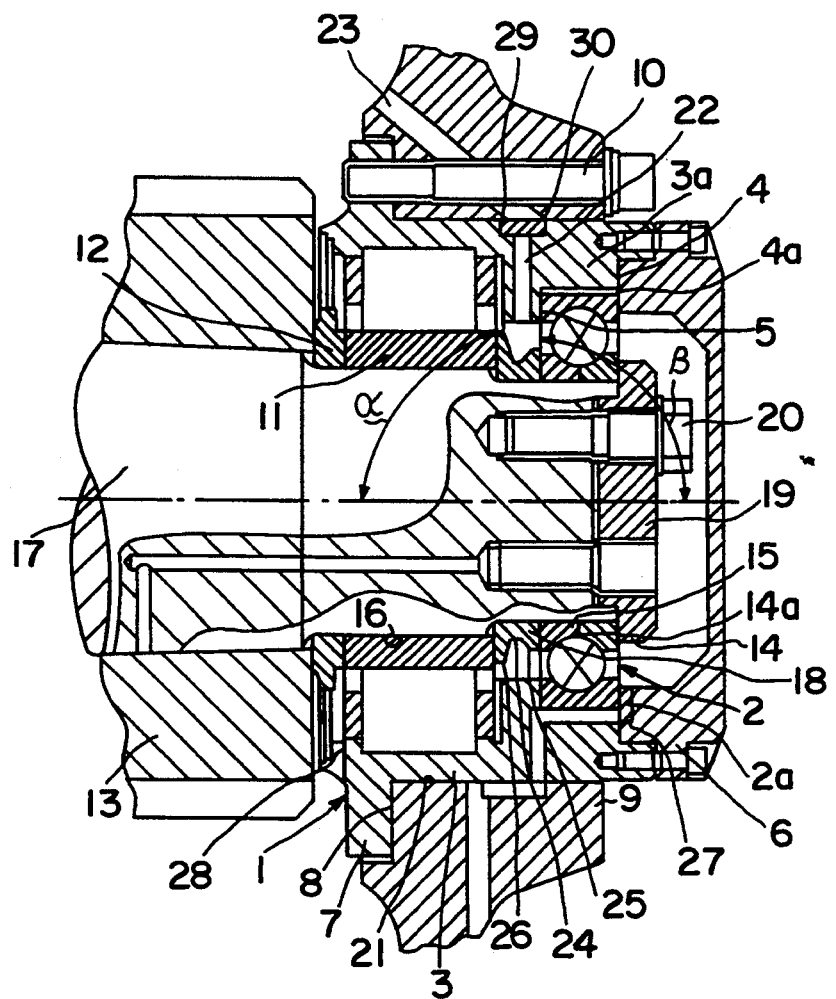

BEARING ASSEMBLY COMPRISING A RADIAL AND AXIAL BEARING

FIELD OF THE INVENTION

The present invention relates to bearing assemblies comprising a radial bearing and axial bearing. More specifically, the present invention relates to improvements in bearing assemblies wherein one end of the outer ring of the radial bearing extends in the axial direction to support the axial bearing.

BACKGROUND OF THE INVENTION

Bearings of this general type are not new per se and on such prior art bearing is shown in West German Utility Model No. 1,897,210. In this prior design, a ball bearing is mounted in an extended needle bushing and the ball bearing is held in an axial direction by a flange formed on the needle bushing. It has been found, however, that assemblies of this type are not suited for absorbing heavy radial or axial forces.

SUMMARY OF THE INVENTION

With the foregoing in mind, it is an object of the present invention to provide a bearing assembly characterized by novel features of construction and arrangement which is capable of absorbing large radial and axial forces and which can be sealed against contaminants in the ambient environment.

To this end, in accordance with the present invention, the outer ring of the radial bearing comprises a solid annular member having an extension which projects from one axial end surface thereof provided with a bore defining a pocket for the axial bearing. The bore is sealed by a bearing housing cover which rests against the axial end surface of the axial bearing and is connected to the outer ring. This design provides a compact bearing assembly comprised of only a few easy to assemble parts.

BRIEF DESCRIPTION OF THE DRAWING

These and other objects of the present invention and the various features and details of the operation and construction thereof are hereinafter more fully set forth with reference to the accompanying drawings, where:

FIG. 1 is a transverse sectional view of a bearing assembly constructed in accordance with the present invention.

DETAILED DESCRIPTION OF THE PREFERRED EMBODIMENT

Referring now to the drawing, the bearing assembly of the present invention comprises a cylindrical roller bearing generally designated by the numeral 1 for absorbing radial forces and a so-called four-point bearing 2 for absorbing axial forces. The cylindrical roller bearing has an outer ring 3 having an axially extended portion $3^a$. The axial extension $3^a$ has a bore $4^a$ extending from its axial end face 4 to define a pocket or cavity for holding the four-point bearing 2. The four-point bearing 2 is mounted with a relatively large radial clearance in bore $4^a$ and abuts at its inner end against a shoulder 5 formed in the outer ring 3. At its outer end, the four-point bearing 2 is held in place in the axial direction in bore $4^a$ by a bearing housing cover 6. The cover 6 abuts axial end surface $2^a$ so that four-point bearing can absorb forces only in the axial direction.

The outer ring 3 of cylindrical roller bearing 1 has a radially outwardly directed attachment flange 7 projecting from the axial end thereof facing away from the four-point bearing 2 which rests against an end surface 8 of housing 9 supported in this position by means of screws 10. The inner ring 11 of cylindrical roller bearing 1 is supported at one end by a sealing washer 12 against a gear wheel 13. The inner ring of four-point bearing 2 is a split ring comprising inner ring segments 14 and $14^a$ which are mounted on shoulders 15, 16 of shaft 17 and are supported a predetermined distance apart by an oil supply ring 18 located between inner ring 11 and the split inner ring of the four-point bearing 2. The inner rings 11, 14 and $14^a$ are held in proper axial position on shaft 17 by a disk 19 secured to the outer axial end face 17 by screws 20. The diameter D of bearing housing cover 6 is the same as the outside diameter $D_o$ of outer ring 3 and consequently shaft 17 with the complete bearing assembly mounted on it can be pushed axially into the housing bore 21 up as far as flange 7 where it can be fastened in place by the external screws 10.

Lubricating means are provided in the form of a radially oriented feed bore 22 located between the cylindrical roller bearing 1 and four-point bearing 2. Lubricating oil flows from a bore 23 in housing 9 through which oil flowing from a bore 23 in housing 9 lubricates oil supply ring 18. Oil supply ring 18 has a groove 24 and side walls 25 and 26 tilted at predetermined angles $\alpha$ and $\beta$ respectively to the axis of the bearing so that as the shaft 17 rotates, some of the oil is supplied to cylindrical roller bearing 1 and sent to four-point bearing 2. The side wall 25 is preferably tilted at an angle $\alpha$ relative to the axis A—A about 70.5° and the side wall 26 is preferably tilted at an angle $\beta$ at about 52.5° to the axis A—A. Exit openings 27, 28 are provided adjacent cylindrical roller bearing 1 and four-point bearing 2 to direct excess oil to flow back through these exit openings to housing 9. Oil feed bore 22 is preferably provided with a circular recess 29 to accommodate a filter 30 to entrap wear particles entrained in the oil. If desired, the number of parts required can be reduced by making mounting flange 7 and extension $3^a$ integral parts of the outer ring 3. This arrangement also prolongs the service life of the bearing because the elimination of bushings between housing 9 and bearing 1 facilitates installation of rolling elements of larger diameter.

Even though a particular embodiment of the present invention has been illustrated and described herein, it is not intended to limit the invention and changes and modifications may be made therein within the scope of the following claims:

What is claimed is:

1. A bearing assembly comprising a radial bearing and an axial bearing, the outer ring of the radial bearing being extended in the axial direction at one end to define a pocket for holding the axial bearing, characterized in that the outer ring (3) of the radial bearing (1) consists of a solid annular member, and in that the extension ($3^a$) of the outer ring (3) is provided with a bore ($4^a$), extending from the end surface (4), to hold the axial bearing (2), said bore being sealed by a bearing housing cover (6), which rests against the end surface ($2^a$) of the axial bearing (3) and is connected to the outer ring (3), an oil supply ring (18) mounted on a shaft (17) between the radial bearing (1) and the axial bearing (2), said oil supply ring being provided with a groove (24) having side surfaces (25), (26) which form angles α and β respectively with the axis of the bearing.

2. A bearing assembly comprising a radial bearing and an axial bearing, the outer ring of the radial bearing being extended in the axial direction at one end to define a pocket for holding the axial bearing, characterized in that the outer ring (3) of the radial bearing (1) consists of a solid annular member, and in that the extension ($3^a$) of the outer ring (3) is provided with a bore ($4^a$), extending from the end surface (4) defining a chamber for the axial bearing (2), means sealing said bore ($4^a$) including a bearing housing cover (6) which rests against the end surface ($2^a$) of the axial bearing (3) and is connected to the outer ring (3) and means for diverting lubricant to the region between the radial bearing (1) and axial bearing (2).

3. A bearing assembly according to claim 2, characterized in that the radial bearing (1) is designed as a cylindrical roller bearing, and in that the axial bearing (2) is designed as a four-point bearing, which is installed with radial play in the bore ($4^a$).

4. A bearing assembly according to claim 2, characterized in that the outer ring (3) of the radial bearing (1) has, on its lateral surface, a radially outward directed attachment flange (7).

5. A bearing assembly according to claim 2, characterized in that the attachment flange (7) is provided on the end of the outer ring (3) which faces away from the axial bearing.

6. A bearing assembly according to claim 2, characterized in that the outside diameter D of the bearing housing cover (6) is the same as the outside diameter $D_o$ of the outer ring (3).

7. A bearing assembly according to claim 2, including an oil feed bore (22) in the outer ring to feed oil to the bearing space located between the radial bearing (1) and the axial force-absorbing bearing (2).

8. A bearing assembly according to claim 2, characterized in that the oil feed bore (22) is provided with a circular recess (29) to hold a filter element (30).

* * * * *